United States Patent
Chen et al.

(10) Patent No.: US 8,743,086 B2
(45) Date of Patent: Jun. 3, 2014

(54) DUAL-MODE TOUCH SENSING APPARATUS

(75) Inventors: Yen-Ting Chen, Taichung (TW);
Ming-Chi Weng, Kinmen County (TW);
Kun-Chi Chiu, Miaoli County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 58 days.

(21) Appl. No.: 13/539,500

(22) Filed: Jul. 2, 2012

(65) Prior Publication Data

US 2013/0181937 A1   Jul. 18, 2013

(30) Foreign Application Priority Data

Jan. 18, 2012   (TW) .............................. 101101971 A

(51) Int. Cl.
  *G06F 3/041* (2006.01)
  *G06F 3/044* (2006.01)
  *G06F 3/046* (2006.01)

(52) U.S. Cl.
  USPC ...................... 345/174; 178/18.06; 178/18.07

(58) Field of Classification Search
  USPC .......... 345/173–178; 178/18.01–18.09, 18.11
  See application file for complete search history.

(56) References Cited

U.S. PATENT DOCUMENTS

| 2002/0053474 A1* | 5/2002 | Chao et al. ................. 178/18.03 |
| 2004/0105040 A1 | 6/2004 | Oh et al. |
| 2006/0109252 A1* | 5/2006 | Kolmykov-Zotov et al. . 345/173 |
| 2009/0073134 A1 | 3/2009 | Huang et al. |
| 2009/0207150 A1* | 8/2009 | Obi et al. ...................... 345/174 |
| 2009/0255737 A1* | 10/2009 | Chang et al. ............... 178/18.06 |
| 2009/0267905 A1* | 10/2009 | Hsu et al. ..................... 345/173 |

FOREIGN PATENT DOCUMENTS

| CN | 1501315 A | 6/2004 |
| CN | 102163112 A | 8/2011 |
| TW | M329825 | 4/2008 |
| TW | M344520 | 11/2008 |

\* cited by examiner

*Primary Examiner* — Stephen Sherman
(74) *Attorney, Agent, or Firm* — CKC & Partners Co., Ltd.

(57) ABSTRACT

The present invention provides a dual-mode touch sensing apparatus. The dual-mode touch sensing apparatus includes a substrate, a first touch sensing electrode formed on the substrate and a second touch sensing electrode formed on the substrate. The first touch sensing electrode is used to perform the capacitive touch sensing technology. The second touch sensing electrode is used to perform the electromagnetic touch sensing technology.

12 Claims, 5 Drawing Sheets

DUAL-MODE TOUCH SENSING APPARATUS

RELATED APPLICATION

This application claims priority to Taiwan Application Serial Number 101101971, filed Jan. 18, 2012, which is herein incorporated by reference.

BACKGROUND

1. Field of Invention

The present invention relates to a touch sensing apparatus, and more particularly to a dual-mode touch sensing apparatus with capacitive and electromagnetic sense technology.

2. Description of Related Art

A dual-mode touch sensing apparatus simultaneously includes a capacitive touch sensing electrode and an electromagnetic touch sensing antenna. When the dual-mode touch sensing apparatus is integrated into a liquid crystal display, the capacitive touch sensing electrode and the electromagnetic touch sensing antenna are disposed in different sides of the Liquid crystal display.

Typically, the electromagnetic sensing antenna is an antenna array formed in a substrate. A control circuit calculates a touch position when a sensing pen touches the electromagnetic sensing antenna. The sensing pen is a transceiver and the substrate with the antenna array is a receiver. When a user uses the sensing pen to touch the substrate, magnetic flux is changed. A control circuit can detect the change of the magnetic flux to calculate the touch position.

Typically, the electromagnetic sensing antenna is adhered to a backside of the liquid crystal display by an adhering process. That is, an additional adhering process is required. It is not beneficial for the cost. Moreover, if the material of the backside board of the liquid crystal display is metal, the sensing of the electromagnetic sensing antenna will be interfered by the metal backside board, thus affecting the sensing operation. On the other hand, the electromagnetic sensing antenna also increases the whole volume of the liquid crystal display.

SUMMARY

By forming a capacitive touch sensing electrode and an electromagnetic touch sensing antenna on the same substrate, the whole volume of a dual-mode touch sensing apparatus is much reduced.

The present invention provides a dual-mode touch sensing apparatus. The dual-mode touch sensing apparatus includes a substrate, a first touch sensing electrode formed on the substrate and a second touch sensing electrode formed on the substrate. The first touch sensing electrode is used to perform the capacitive touch sensing technology. The second touch sensing electrode is used to perform the electromagnetic touch sensing technology.

In an embodiment, the first touch sensing electrode is a projected capacitive touch sensing electrode and formed on a first surface of the substrate, and the second touch sensing electrode is an electromagnetic touch sensing antenna and formed in a second surface of the substrate.

In an embodiment, a switch circuit is coupled with the electromagnetic touch sensing antenna, and when the projected capacitive touch sensing electrode is operated, the switch circuit is turned off to stop an operation of the electromagnetic touch sensing loop.

In an embodiment, the projected capacitive touch sensing electrode further comprises a first-direction sensing electrode layer located on the first surface of the substrate, an insulation layer located on the first-direction sensing electrode layer and a second-direction sensing electrode layer located on the insulation layer. The first-direction sensing electrode layer further comprises a plurality of first electrode strings which are arranged in parallel along a first direction, and each of the first electrode strings includes a plurality of first rhombus-shaped electrodes arranged in series. The second-direction sensing electrode layer further comprises a plurality of second electrode strings which are arranged in parallel along a second direction, and each of the second electrode strings includes a plurality of second rhombus-shaped electrodes arranged in series. The first rhombus-shaped electrodes and the second rhombus-shaped electrodes are alternately arranged.

In an embodiment, the electromagnetic touch sensing antenna further comprises a first-direction antenna loop located on the second surface of the substrate, an insulation layer located on the first-direction antenna loop, and a second-direction antenna loop located on the insulation layer. The first-direction antenna loop further comprises a plurality of "⊓" shaped first antenna segments. Two adjacent first antenna segments belong to different sensing loops. The second-direction antenna loop further comprises a plurality of "⊓" shaped second antenna segments, wherein two adjacent second antenna segments belong to different sensing loops.

In an embodiment, the first touch sensing electrode is a projected capacitive touch sensing electrode and formed on a first surface of the substrate, and the second touch sensing electrode is an electromagnetic touch sensing antenna and formed on the first surface and a second surface of the substrate.

In an embodiment, the projected capacitive touch sensing electrode further comprises a first-direction sensing electrode layer located on the first surface of the substrate, a first insulation layer located on the first-direction sensing electrode layer and a second-direction sensing electrode layer located on the insulation layer. The first-direction sensing electrode layer further comprises a plurality of first electrode strings which are arranged in parallel along a first direction, and each of the first electrode strings includes a plurality of first rhombus-shaped electrodes arranged in series. The second-direction sensing electrode layer further comprises a plurality of second electrode strings which are arranged in parallel along a second direction. Each of the second electrode strings includes a plurality of second rhombus-shaped electrodes arranged in series. The first rhombus-shaped electrodes and the second rhombus-shaped electrodes are alternately arranged.

In an embodiment, the electromagnetic touch sensing antenna further comprises a first-direction antenna loop located on the second surface of the substrate, a second insulation layer located on the first-direction antenna loop and a second-direction antenna loop located on the first surface. The first-direction antenna loop further comprises a plurality of first antenna segments. Two adjacent first antenna segments belong to different sensing loops. The second-direction antenna loop further comprises a plurality of second sawtooth shaped antenna segments, and each of the sawtooth shaped antenna segments surrounds correspondingly the first electrode string.

In an embodiment, the electromagnetic touch sensing antenna further comprises a second-direction antenna loop located on the second surface, a second insulation layer located on the second-direction antenna loop and a first-direction antenna loop located on the first insulation layer. The second-direction antenna loop further comprises a plurality of second antenna segment. Two adjacent second antenna segments belong to different sensing loop. The first-direction antenna loop further comprises a plurality of sawtooth shaped antenna segment. Each sawtooth shaped antenna segment surrounds corresponding the second electrode string.

Accordingly, the capacitive touch sensing electrode and the electromagnetic touch sensing antenna loop are formed on the same substrate to form a dual-mode touch sensing apparatus. Therefore, the whole volume of the dual-mode touch sensing apparatus is much reduced.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
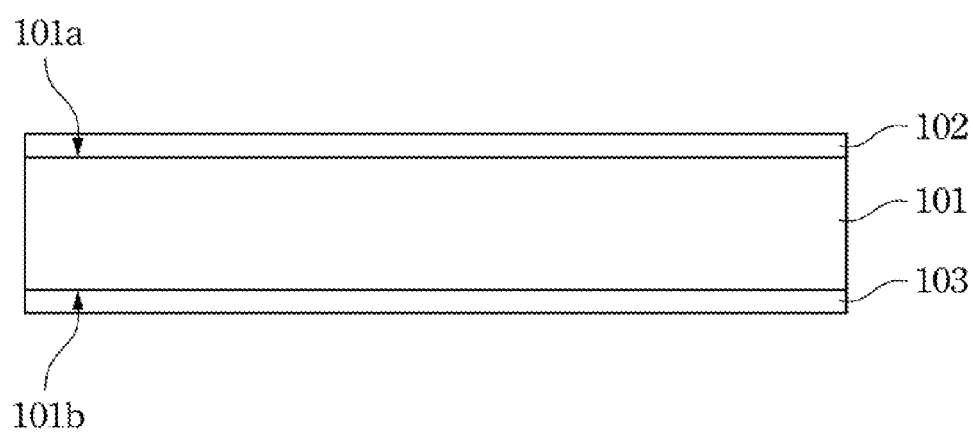
FIG. 1 illustrates a schematic diagram of a dual-mode touch sensing apparatus according to a preferred embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a schematic diagram of a dual-mode touch sensing apparatus according to a preferred embodiment of the present invention. The dual-mode touch sensing apparatus 100 includes a substrate 101, a capacitive touch sensing electrode 102 and an electromagnetic touch sensing antenna 103. In an embodiment, the substrate 101 is an ITO (indium tin oxide) glass substrate with a first surface 101a and a second surface 101b. The capacitive touch sensing electrode 102 is formed on the first surface 101a. The electromagnetic touch sensing antenna 103 is formed on the second surface 101b. A semiconductor manufacturing process is used to form the capacitive touch sensing electrode 102 on the first surface 101a. The capacitive touch sensing electrode 102 is a projected capacitive touch sensing electrode, a surface capacitive touch sensing electrode or another type of capacitive touch sensing electrode. In this embodiment, the capacitive touch sensing electrode 102 is formed as a projected capacitive touch sensing electrode.

Figure 2:
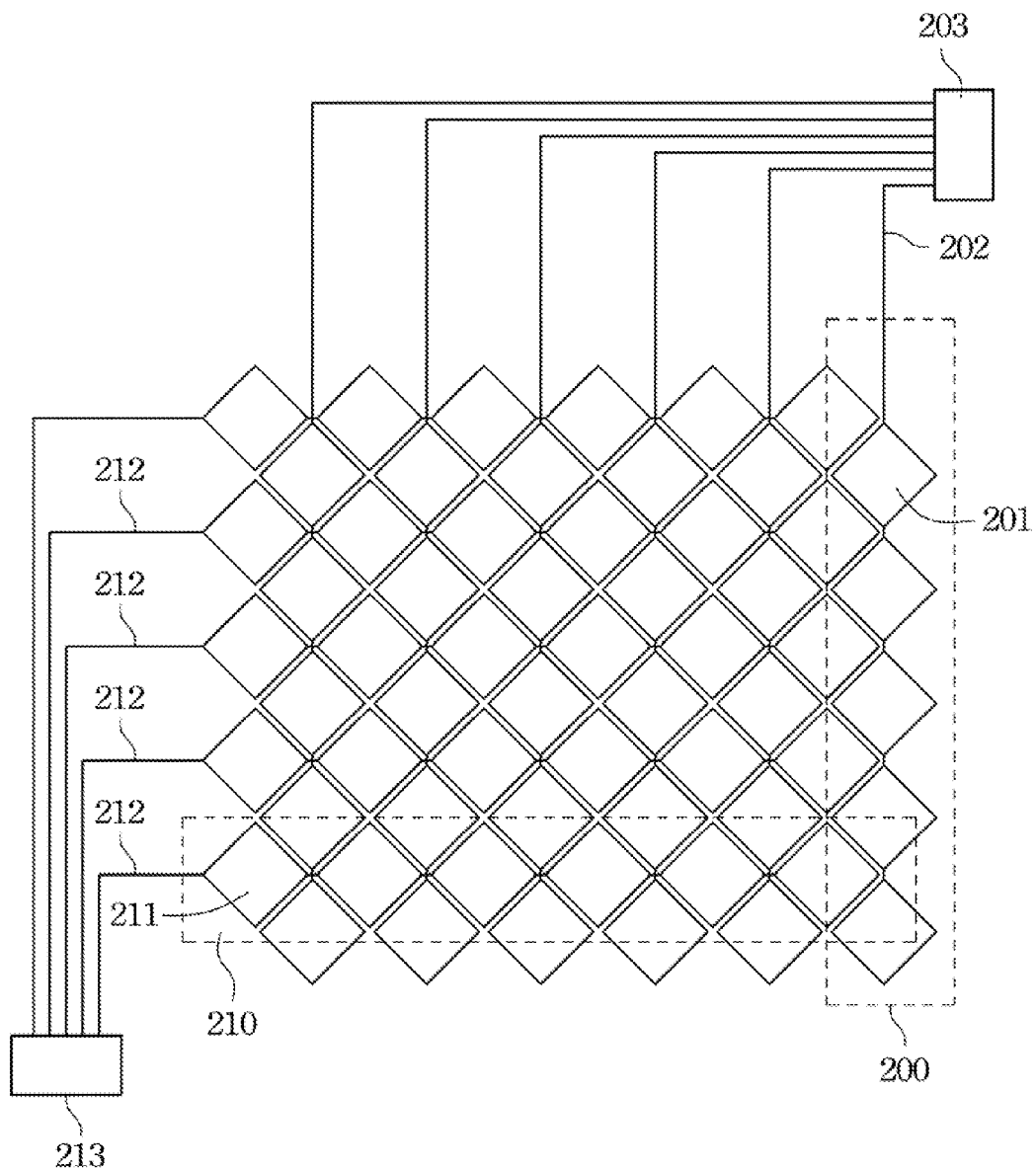
FIG. 2 illustrates a schematic diagram of a projected capacitive touch sensing electrode according to a preferred embodiment of the present invention.

FIG. 2 illustrates a schematic diagram of a projected capacitive touch sensing electrode according to a preferred embodiment of the present invention. In an embodiment, a capacitive touch sensing electrode 102 is formed on the first surface 101a. First, a sputtering method is used to form a first indium tin oxide (ITO) layer in the first surface 101a of the substrate 101. Then, a photolithography and etching process is performed on the first indium tin oxide (ITO) layer to form a Y-direction touch sensing electrode layer. The Y-direction touch sensing electrode layer includes a plurality electrode strings 200 which are arranged in parallel to each other in the Y-direction. Each Y-direction electrode string 200 includes a plurality of rhombus-shaped electrodes 201 arranged in series. Each Y-direction electrode string 200 is connected to a drive line 202. Next, a dielectric layer (not shown in this figure) is formed on the Y-direction touch sensing electrode layer to serve as an insulating layer by a coating method. A sputtering method is used to form a second indium tin oxide (ITO) layer on the dielectric layer. Then, a photolithography and etching process is performed on the second indium tin oxide (ITO) layer to form an X-direction touch sensing electrode layer. The X-direction touch sensing electrode layer includes a plurality of electrode strings 210 arranged in parallel to each other and in the X-direction. Each X-direction electrode string 210 includes a plurality of rhombus-shaped electrodes 211 arranged in series. Each X-direction electrode string 210 is connected to a drive line 212. The rhombus-shaped electrode 201 and the rhombus-shaped electrode 211 are alternately arranged to form the capacitive touch sensing electrode 102. Moreover, the drive line 202 in the Y-direction and the drive 212 in the X-direction are connected to a controller through connection ports 203 and 213. The controller can detect the change of capacitance among the capacitive touch sensing electrode 102 to calculate the touch position.

Figure 3A:
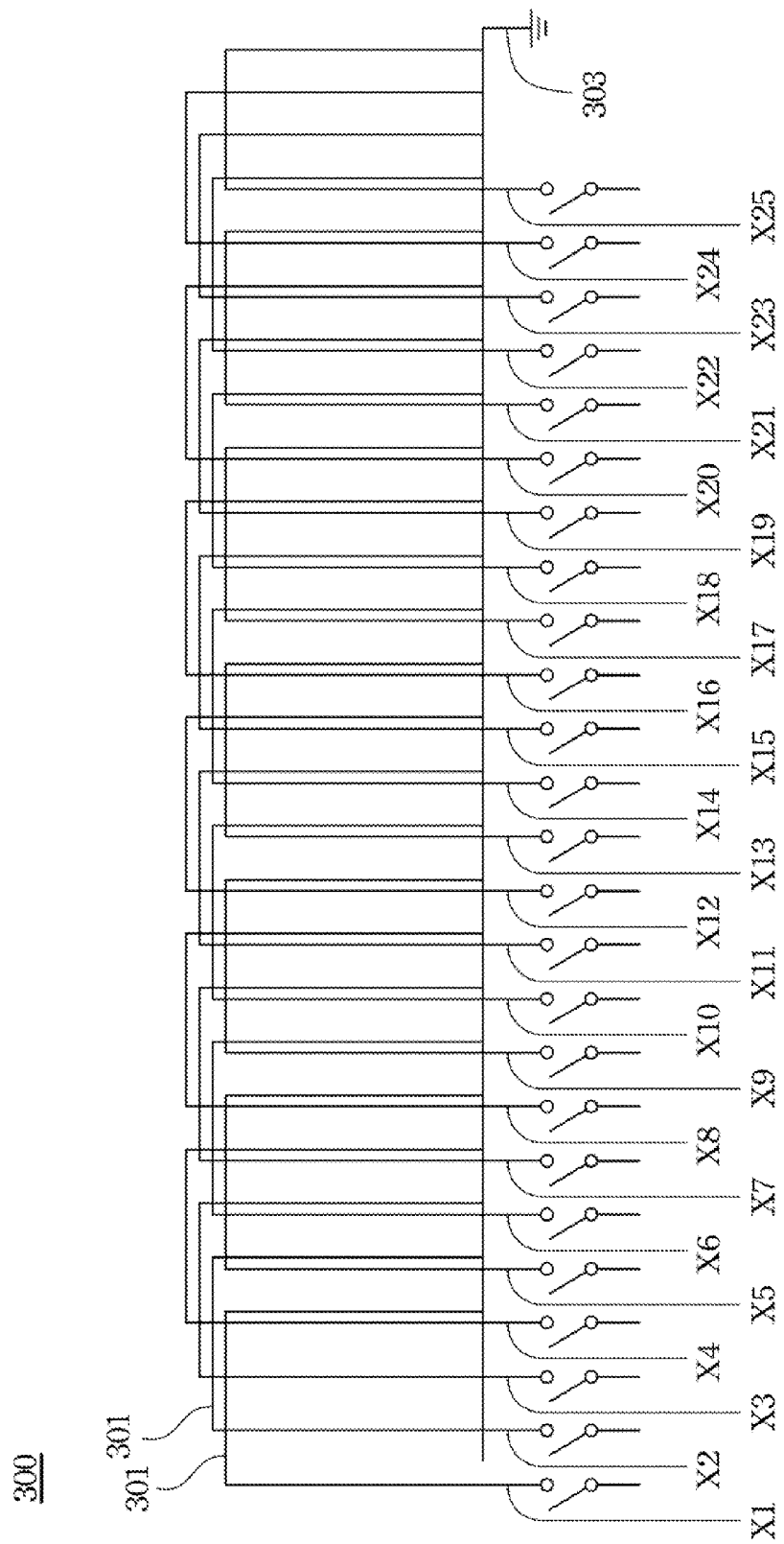
FIG. 3A illustrates a schematic diagram of an X-direction antenna loop according to an embodiment of the present invention.
Figure 3B:
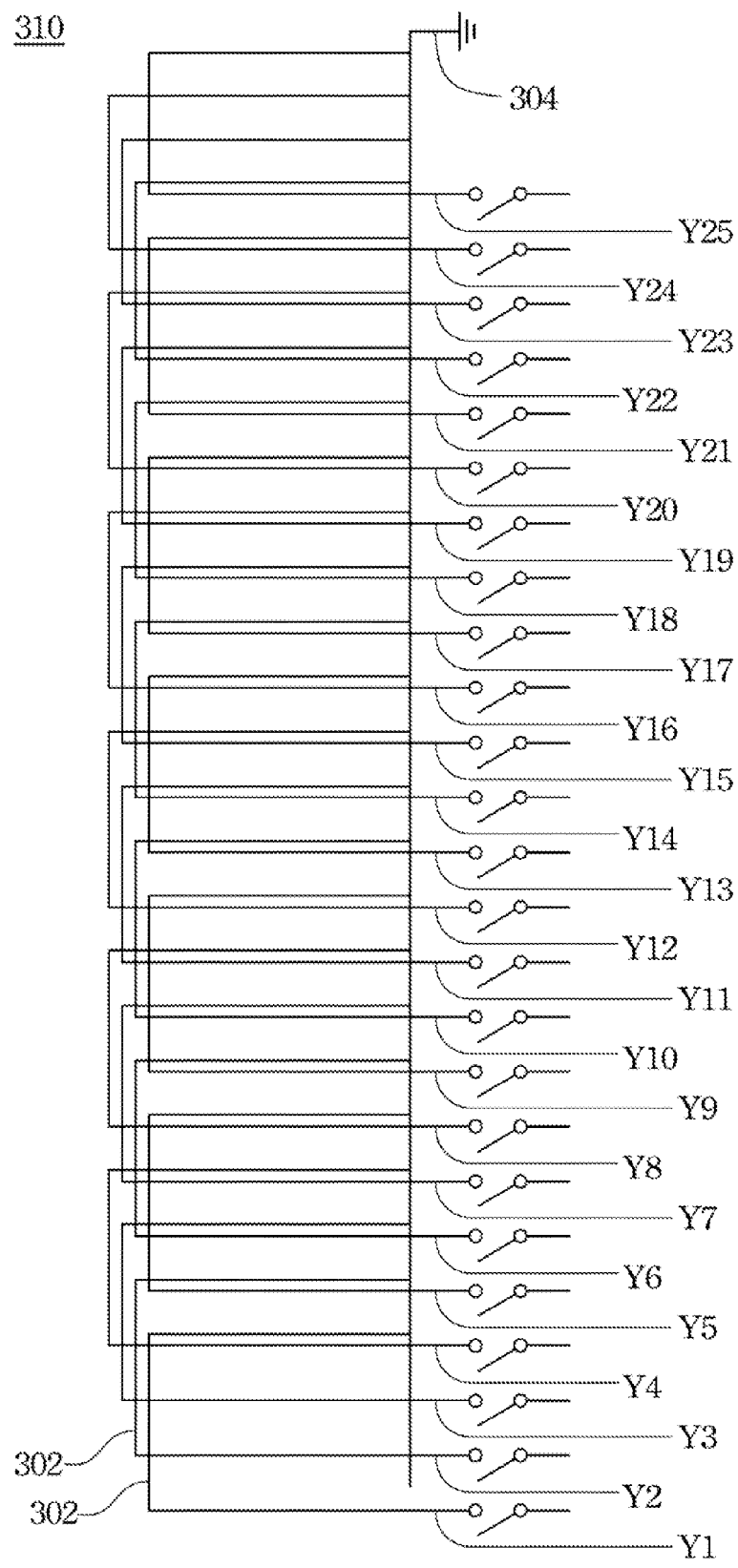
FIG. 3B illustrates a schematic diagram of a Y-direction antenna loop according to an embodiment of the present invention.

Moreover, an electromagnetic touch sensing antenna 103 is formed on the second surface 101b of the substrate 101 after the capacitive touch sensing electrode is finished. The electromagnetic touch sensing antenna 103 includes a grid antenna composed of a plurality of sensing antennas to sense the change of magnetic flux to calculate the touch position. In an embodiment, a sputtering method is used to form a first indium tin oxide (ITO) layer on the second surface 101b of the substrate 101. Then, a photolithography and etching process is performed on the first indium tin oxide (ITO) layer to form an X-direction antenna loop 300 as illustrated in FIG. 3A. The X-direction antenna loop 300 includes a plurality of "⊓" shaped antennas 301. Two adjacent "⊓" shaped antennas 301 belong to different sensing loops. Therefore, the touch position can be determined by detecting which "⊓" shaped antenna 301 has the change of magnetic flux occurring therein. One end of each "⊓" shaped antenna 301 is connected to a switch, such as a switch X1 to X25, and the other end thereof is connected to a grounded point 303. Therefore, the magnetic flux of these "⊓" shaped antennas 301 can be obtained by sequentially switching the switches X1 to X25. Next, a dielectric layer (not shown in this figure) is formed on the X-direction antenna loop 300 to serve as an insulating layer by a coating method. A sputtering method is used to form a second indium tin oxide (ITO) layer on the dielectric layer. Then, a photolithography and etching process is performed on the second indium tin oxide (ITO) layer to form a Y-direction antenna loop 310 as illustrated in FIG. 3B. The Y-direction antenna loop 310 includes a plurality of "⊓" shaped antennas 302. Two adjacent "⊓" shaped antennas 302 belong to different sensing loops. Such structure may help to distinguish which sensing loop happens the electromagnetic induction change. One end of each "⊓" shaped antenna 302 is connected to a switch, such as switch Y1 to Y25, and the other end is connected to a grounded point 304. Accordingly, the magnetic flux of these "⊓" shaped antennas 302 can be obtained by sequentially switching the switches Y1 to Y25. Therefore, the electromagnetic touch sensing antenna 103 is formed on the second surface 101b. The electromagnetic touch sensing antenna 103 and the capacitive touch sensing electrode 102 formed on the first surface 101a constitute the dual-mode touch sensing apparatus.

It is noted that the capacitive touch sensing electrode 102 is formed on the first surface 101a, and then, the electromagnetic touch sensing antenna 103 is formed on the second surface 101b to form the dual mode touch sensing apparatus 100 in the above embodiment. However, in another embodiment, the electromagnetic touch sensing antenna 103 is formed on the second surface 101b, and then, the capacitive touch sensing electrode 102 is formed on the first surface 101a to form the dual mode touch sensing apparatus 100.

Moreover, in another embodiment, one of the X-direction antenna loop 300 and the Y-direction antenna loop 310 of the electromagnetic touch sensing antenna 10 is formed on the first surface 101a of the substrate 101. That is, one of the X-direction antenna loop 300 and the Y-direction antenna loop 310 is integrated into the capacitive touch sensing electrode 102.

Figure 4:
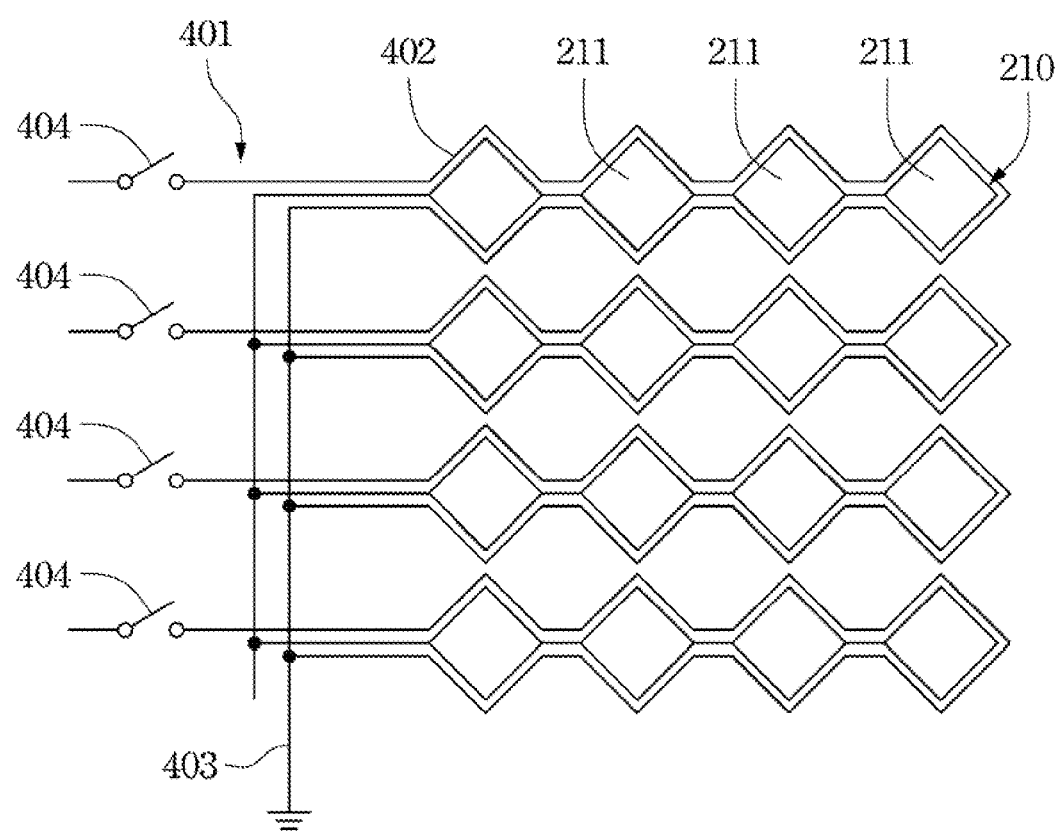
FIG. 4 illustrates a schematic diagram that a Y-direction antenna loop of an electromagnetic touch sensing antenna is integrated into an X-direction touch sensing electrode layer of a capacitive touch sensing electrode.

FIG. 4 illustrates a schematic diagram that a Y-direction antenna loop of an electromagnetic touch sensing antenna is integrated into an X-direction touch sensing electrode layer of a capacitive touch sensing electrode. In FIG. 4, only the Y-direction antenna loop and X-direction electrode string 210 are illustrated. It is noted that an X-direction antenna loop of an electromagnetic touch sensing antenna is integrated into a Y-direction touch sensing electrode layer of a capacitive touch sensing electrode in another embodiment. The Y-direction antenna loop 401 is disposed between two adjacent X-direction electrode strings 210. Because each X-direction electrode string 210 includes a plurality of rhombus-shaped electrodes 211, the Y-direction antenna loop 401 includes a plurality of sawtooth-shaped antenna segments 402 connected in series and surrounding the rhombus-shaped electrode 211. One end of each sawtooth-shaped antenna segment 402 is connected to a switch 404, and the other end of the sawtooth-shaped antenna segment 402 is connected to a grounded point 403. Accordingly, by sequentially switching the switch 404, a sensing signal is got.

Because the material for forming both the X-direction electrode string 210 and the Y-direction antenna loop 401 is indium tin oxide, both the X-direction electrode string 210 and the Y-direction antenna loop 401 are formed in same time after an indium tin oxide layer is formed on the substrate. That is, only one mask is needed to form the X-direction electrode string 210 and the Y-direction antenna loop 401. The process time is much reduced and the cost is also reduced.

Moreover, only the electromagnetic touch sensing antenna 103 is triggered to sense the touch position when a sensing pen touches the dual-mode touch sensing apparatus 100. On the other hand, the electromagnetic touch sensing antenna 103 is forced into a low scan frequency operation state when a finger touches the dual-mode touch sensing apparatus 100. That is, in this case, the capacitive touch sensing electrode 102 is triggered to sense the touch position.

However, when both the sensing pen and the finger touch the dual-mode touch sensing apparatus 100, the electromagnetic touch sensing antenna 103 and the capacitive touch sensing electrode 102 are triggered at the same time. An incorrect sensing result happens because both the X-direction electrode string 210 and the Y-direction antenna loop 401 are formed together that will cause a coupling effect of electrical field. For preventing the above case from occurring, a control switch 404 is connected to the Y-direction antenna loop 401. When the capacitive touch sensing electrode 102 is operated, the control switch 404 is turned off to stop the operation of the electromagnetic touch sensing antenna 103. For example, when both the sensing pen and the finger touch the dual-mode touch sensing apparatus 100, the control switch 404 is turned off to stop the operation of the electromagnetic touch sensing antenna 103. Therefore, only the capacitive touch sensing electrode 102 is triggered to sense the touch position to prevent interference from the electromagnetic touch sensing antenna 103. On the other hand, because the Y-direction antenna loop 401 surrounds the X-direction electrode string 210, the Y-direction antenna loop 401 acts as an electrostatic protection circuit. When a sensing pen touches the dual-mode touch sensing apparatus, the switch 404 is turned on to trigger the Y-direction antenna loop 401. At this time, the Y-direction antenna loop 401 works with the X-direction antenna loop 402 formed on the other side of the substrate to form a XY antenna loop to sense the touch position.

Accordingly, the capacitive touch sensing electrode and the electromagnetic touch sensing antenna are formed on the same substrate to form a dual-mode touch sensing apparatus. Therefore, the whole volume of the dual-mode touch sensing apparatus is much reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A dual-mode touch sensing apparatus, comprising:
    a substrate;
    a first touch sensing electrode formed on the substrate, wherein the first touch sensing electrode is used to perform a first type of touch sensing technology for sensing a touch position;
    a second touch sensing electrode formed on the substrate, wherein the second touch sensing electrode is used to perform a second type of touch sensing technology for sensing a touch position; and
    a switch circuit coupled with the second touch sensing electrode;
    wherein the first type touch sensing technology is a capacitive touch sensing technology, and the second type touch sensing technology is an electromagnetic touch sensing technology;
    wherein the first touch sensing electrode is a projected capacitive touch sensing electrode and the second touch sensing electrode is an electromagnetic touch sensing antenna;
    wherein when both a sensing pen and a user's finger touch the dual-mode touch sensing apparatus, the switch is turned off to stop an operation of the second touch sensing electrode.

2. The dual-mode touch sensing apparatus of claim 1, wherein the projected capacitive touch sensing electrode and is formed on a first surface of the substrate, and the electromagnetic touch sensing antenna and is formed on a second surface of the substrate.

3. The dual-mode touch sensing apparatus of claim 2, wherein the electromagnetic touch sensing antenna further comprises:
    a first-direction antenna loop located on the second surface of the substrate, wherein the first-direction antenna loop further comprises a plurality of "⊓" shaped first antenna segments, wherein two adjacent "⊓" shaped first antenna segments belong to different sensing loop;
    an insulation layer located on the first-direction antenna loop; and a second-direction antenna loop located on the insulation layer, wherein the second-direction antenna loop further comprises a plurality of "⊓" shaped second antenna segments, wherein two adjacent "⊓" shaped second antenna segments belong to different sensing loop.

4. The dual-mode touch sensing apparatus of claim 2, wherein the projected capacitive touch sensing electrode further comprises:
   a first-direction sensing electrode layer located on the first surface of the substrate, wherein the first-direction sensing electrode layer further comprises a plurality of first electrode strings which are arranged in parallel along a first direction, each of the first electrode strings including a plurality of first rhombus-shaped electrodes arranged in series;
   an insulation layer located on the first-direction sensing electrode layer; and
   a second-direction sensing electrode layer located on the insulation layer, wherein the second-direction sensing electrode layer further comprises a plurality of second electrode strings which are arranged in parallel along a second direction, each of the second electrode strings including a plurality of second rhombus-shaped electrodes arranged in series, wherein the first rhombus-shaped electrodes and the second rhombus-shaped electrodes are alternately arranged.

5. The dual-mode touch sensing apparatus of claim 4, wherein the electromagnetic touch sensing antenna further comprises:
   a first-direction antenna loop located on the second surface of the substrate, wherein the first-direction antenna loop further comprises a plurality of "⊓" shaped first antenna segments, wherein two adjacent "⊓" shaped first antenna segments belong to different sensing loop;
   an insulation layer located on the first-direction antenna loop; and
   a second-direction antenna loop located on the insulation layer, wherein the second-direction antenna loop further comprises a plurality of "⊓" shaped second antenna segments, wherein two adjacent "⊓" shaped second antenna segments belong to different sensing loop.

6. The dual-mode touch sensing apparatus of claim 1, wherein the first touch sensing electrode is a projected capacitive touch sensing electrode and is formed on a first surface of the substrate, and the second touch sensing electrode is an electromagnetic touch sensing antenna and is formed on the first surface and a second surface of the substrate.

7. The dual-mode touch sensing apparatus of claim 6, wherein the electromagnetic touch sensing antenna further comprises:
   a first-direction antenna loop located on the second surface of the substrate, wherein the first-direction antenna loop further comprises a plurality of first antenna segments, wherein two adjacent first antenna segments belong to different sensing loop;
   a second insulation layer located on the first-direction antenna loop; and
   a second-direction antenna loop located on the first surface, wherein the second-direction antenna loop further comprises a plurality of second sawtooth shaped antenna segments, each of the sawtooth shaped antenna segments surrounding the first electrode string corresponding to the first direction.

8. The dual-mode touch sensing apparatus of claim 6, wherein the electromagnetic touch sensing antenna further comprises:
   a second-direction antenna loop located on the second surface, wherein the second-direction antenna loop further comprises a plurality of second antenna segments, wherein two adjacent second antenna segments belong to different sensing loop;
   a second insulation layer located on the second-direction antenna loop; and
   a first-direction antenna loop located on the first insulation layer, wherein the first-direction antenna loop further comprises a plurality of sawtooth shaped antenna segments, each of the sawtooth shaped antenna segments surrounding the second electrode string corresponding to the second direction.

9. The dual-mode touch sensing apparatus of claim 6, wherein the projected capacitive touch sensing electrode further comprises:
   a first-direction sensing electrode layer located on the first surface of the substrate, wherein the first-direction sensing electrode layer further comprises a plurality of first electrode strings which are arranged in parallel along a first direction, each of the first electrode strings includes a plurality of first rhombus-shaped electrodes arranged in series;
   a first insulation layer located on the first-direction sensing electrode layer; and
   a second-direction sensing electrode layer located on the insulation layer, wherein the second-direction sensing electrode layer further comprises a plurality of second electrode strings which are arranged in parallel along a second direction, each of the second electrode strings including a plurality of second rhombus-shaped electrodes arranged in series, wherein the first rhombus-shaped electrodes and the second rhombus-shaped electrodes are alternately arranged.

10. The dual-mode touch sensing apparatus of claim 9, wherein the electromagnetic touch sensing antenna further comprises:
    a first-direction antenna loop located on the second surface of the substrate, wherein the first-direction antenna loop further comprises a plurality of first antenna segments, wherein two adjacent first antenna segments belong to different sensing loop;
    a second insulation layer located on the first-direction antenna loop; and
    a second-direction antenna loop located on the first surface, wherein the second-direction antenna loop further comprises a plurality of second sawtooth shaped antenna segments, each of the sawtooth shaped antenna segments surrounding the first electrode string corresponding to the first direction.

11. The dual-mode touch sensing apparatus of claim 9, wherein the electromagnetic touch sensing antenna further comprises:
    a second-direction antenna loop located on the second surface, wherein the second-direction antenna loop further comprises a plurality of second antenna segments, wherein two adjacent second antenna segments belong to different sensing loop;
    a second insulation layer located on the second-direction antenna loop; and
    a first-direction antenna loop located on the first insulation layer, wherein the first-direction antenna loop further comprises a plurality of sawtooth shaped antenna segments, each of the sawtooth shaped antenna segments surrounding the second electrode string corresponding to the second direction.

12. The dual-mode touch sensing apparatus of claim 1, wherein only the second touch sensing electrode is triggered to sense a touch position when only the sensing pen touches the dual-mode touch sensing apparatus, and the second touch sensing electrode is forced into a low scan frequency operation state and only the first touch sensing electrode is triggered when only the user's finger touches the dual-mode touch sensing apparatus.

* * * * *